United States Patent [19]

Nakao

[11] 4,019,751
[45] Apr. 26, 1977

[54] MULTI-PURPOSE INFANT'S WHEELED CHAIR

[75] Inventor: Shinroku Nakao, Yokohama, Japan
[73] Assignee: Combi Co., Ltd., Tokyo, Japan
[22] Filed: May 20, 1975
[21] Appl. No.: 579,202
[30] Foreign Application Priority Data
  May 30, 1974 Japan .................. 49-62359[U]
[52] U.S. Cl. .................................. 280/31; 297/355
[51] Int. Cl.$^2$ ........................................ B62B 3/04
[58] Field of Search ............. 280/30, 31; 297/354, 297/355

[56] References Cited
UNITED STATES PATENTS

| | | | |
|---|---|---|---|
| 1,809,226 | 6/1931 | Walter | 297/355 |
| 2,461,609 | 2/1949 | Light | 280/31 |
| 3,334,909 | 8/1967 | Smith | 280/31 |
| 3,463,504 | 8/1969 | Petry | 280/31 |
| 3,550,998 | 12/1970 | Boudreau | 280/31 |
| 3,659,865 | 5/1972 | Nothacker | 280/31 X |
| 3,692,359 | 9/1972 | Boucher | 280/30 |

FOREIGN PATENTS OR APPLICATIONS
111,457  12/1973  Japan

*Primary Examiner*—Joseph F. Peters, Jr.
*Assistant Examiner*—John P. Silverstrim

[57] ABSTRACT

A multipurpose infant's wheel chair having a rockable base with front and rear wheels which can be swung to engage ground or to be positioned so that the rockable base engages ground. Accordingly, the device is usable for rocking or rolling. The base also has a member positionable selectively to engage ground so that the base is held stationary with respect thereto. A chair seat and back rest hingedly secured to each other are carried on the base and selectively positionable so that an infant may be seated upright or in the reclining position. Thus, the invention is capable of a variety of uses in that it can be used as a rocking chair or rocking horse, or as a stroller, dependent on the selected position of the wheels. The invention is also usable as a bed for an infant with the base held stationary so as to be non-rollable and non-rockable. Alternatively, the base may be retained in rockable position with the back rest reclining so that a child may be rocked to sleep.

9 Claims, 11 Drawing Figures

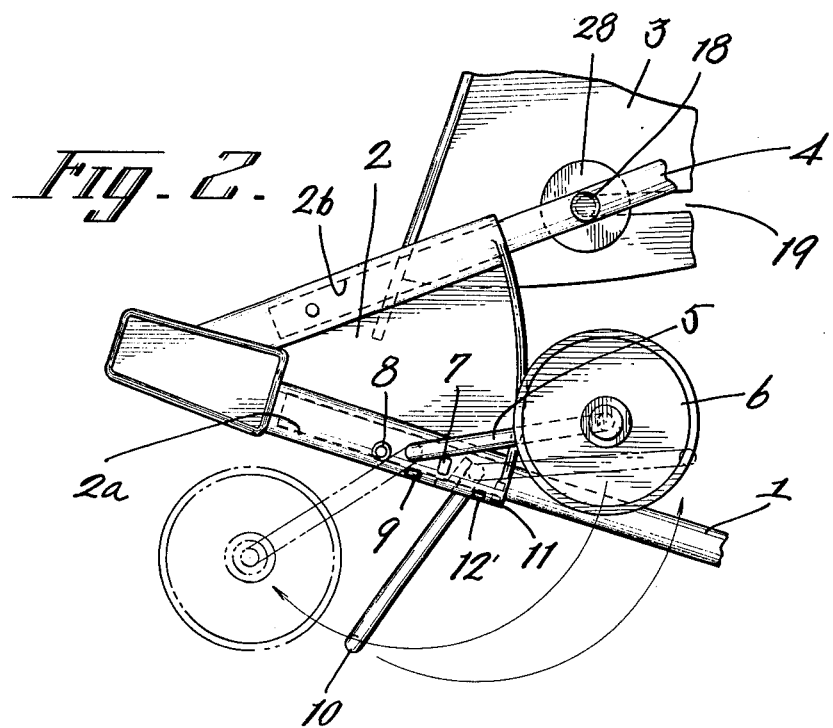
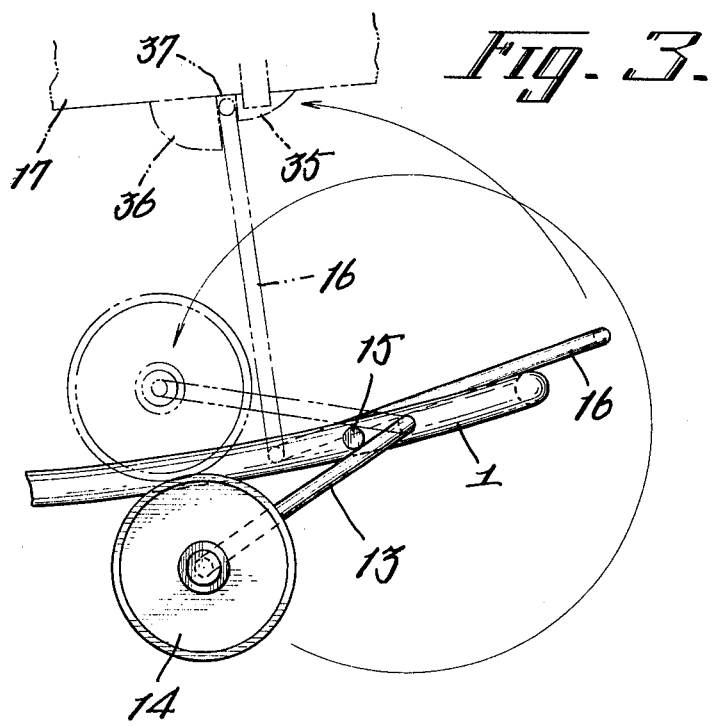

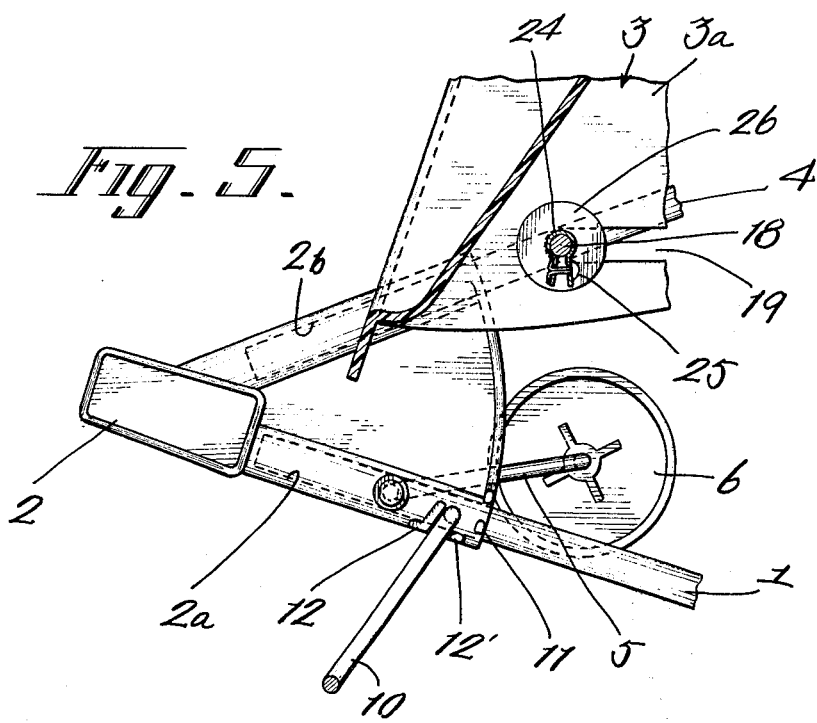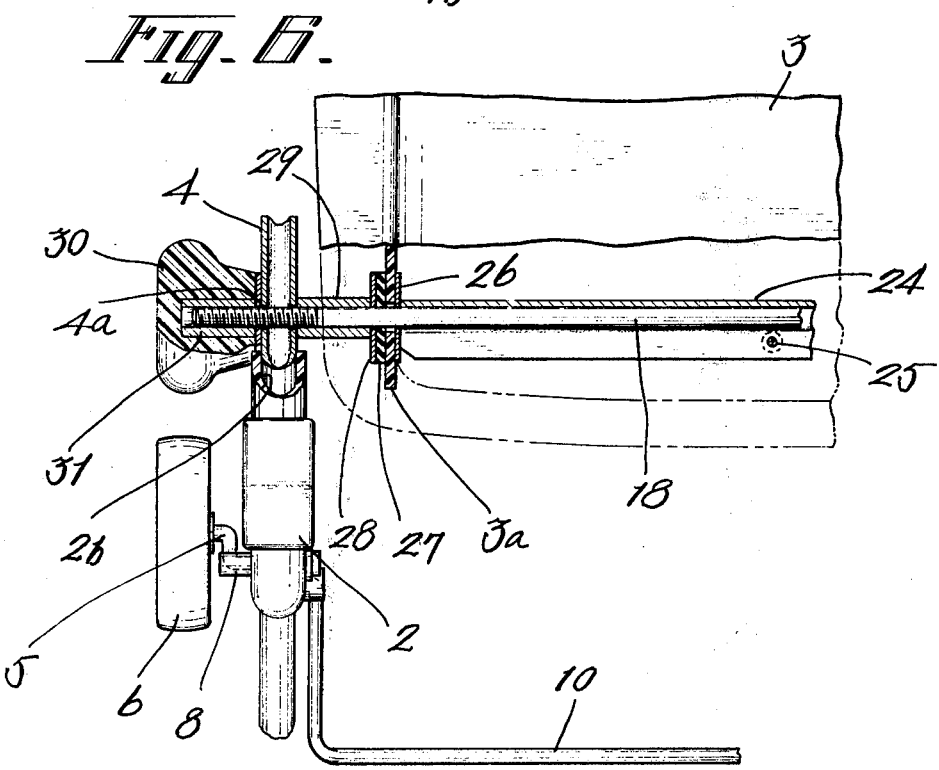

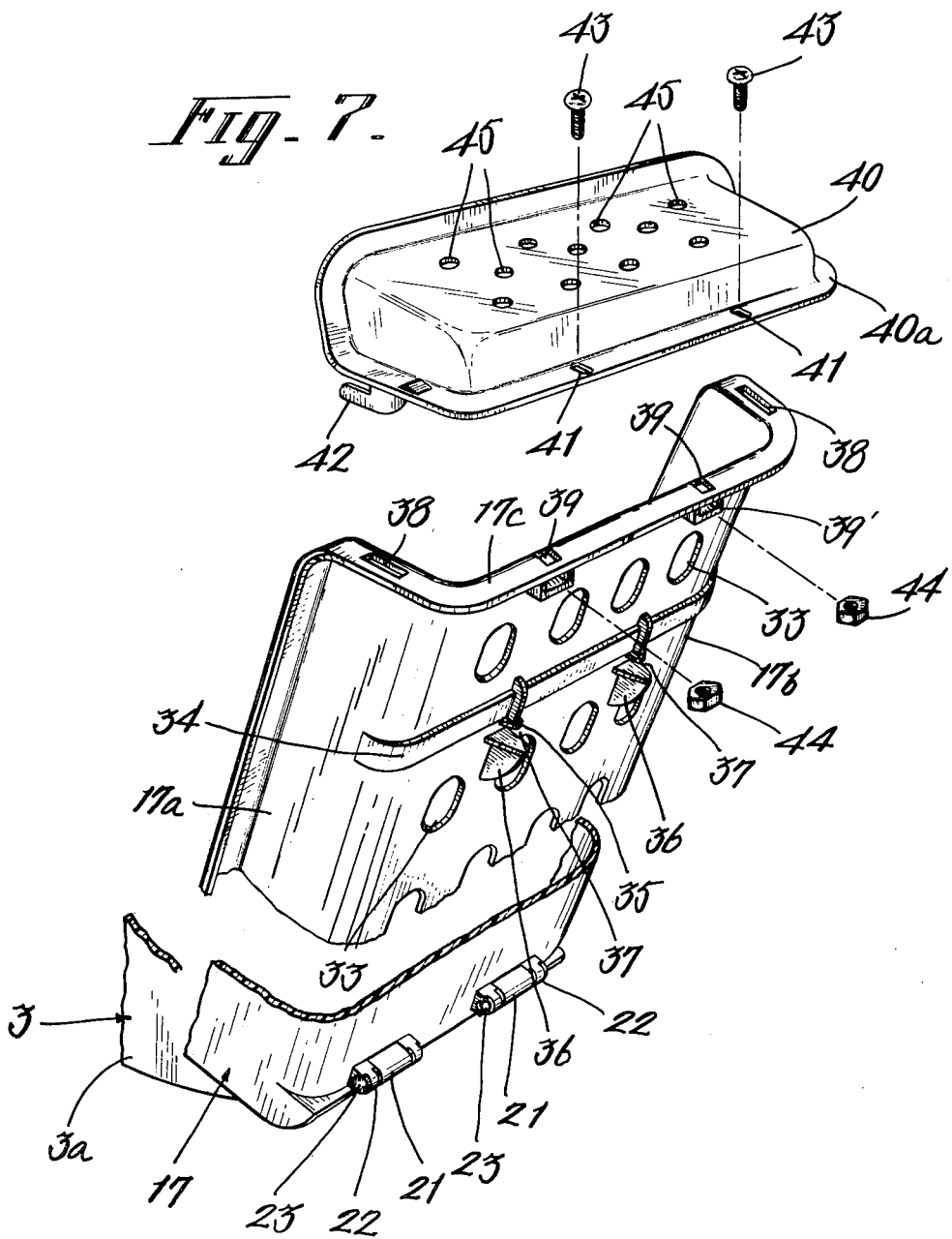

MULTI-PURPOSE INFANT'S WHEELED CHAIR

BACKGROUND OF THE INVENTION

This invention relates to an infant's wheeled chair and more particularly, to a multi-purpose infant's wheeled chair which can be employed as a baby carriage, rocking play device or bed as desired.

In the past, a great variety of infant's chairs have been proposed and one of the prior art infant's chairs receives the entire body of an infant and the reclining angle of the back rest of the chair can be freely varied. However, the conventional infant's chair has the disadvantages that as the position of the body of the infant in the chair approaches the horizontal as the back rest of the chair is reclined fully, since the center of gravity of the infant's body moves toward its head, the upper portion of the back rest loses its stability and the application of the chair is limited to a very narrow range.

SUMMARY OF THE INVENTION

Therefore, one principal object of the present invention is to provide a novel and improved multi-purpose infant's wheeled chair which can effectively eliminate the disadvantages inherent in the prior art infant's chairs.

Another object of the present invention is to provide a novel and improved multi-purpose infant's wheeled chair which can be employed as a baby carriage, rocking play device or bed as desired by moving a few parts of the chair.

Another object of the present invention is to provide a novel and improved multi-purpose infant's wheeled chair in which the back rest can be maintained in its stabilized state even when the back rest is reclined to the horizontal position and the head cover secured to the top of the back rest protects the infant from falling off the chair when the back rest is in the horizontal position.

A still further object of the present invention is to provide a novel and improved multi-purpose infant's wheeled chair the position of which can be simply and readily varied between the normal seating, horizontal and any intermediate reclined positions between the seating and horizontal positions as desired through a quite simple manipulation.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

BRIEF DESCRIPTION OF THE DRAWINGS

FIG. 2 is a fragmentary side elevational view on an enlarged scale showing the front wheels and their associated parts of said multi-purpose infant's wheeled chair;

FIG. 3 is a fragmentary side elevational view on an enlarged scale showing the rear and their associated parts of said multi-purpose infant's wheel chair;

FIG. 5 is a vertical sectional view in side elevation of FIG. 2;

FIG. 6 is a vertical sectional view in front elevation of FIG. 2;

FIG. 7 is a fragmentary perspective view on an enlarged scale of the back rest and head cover of said multi-purpose infant's wheeled chair of FIG. 1;

PREFERRED EMBODIMENT OF THE INVENTION

Figure 1:
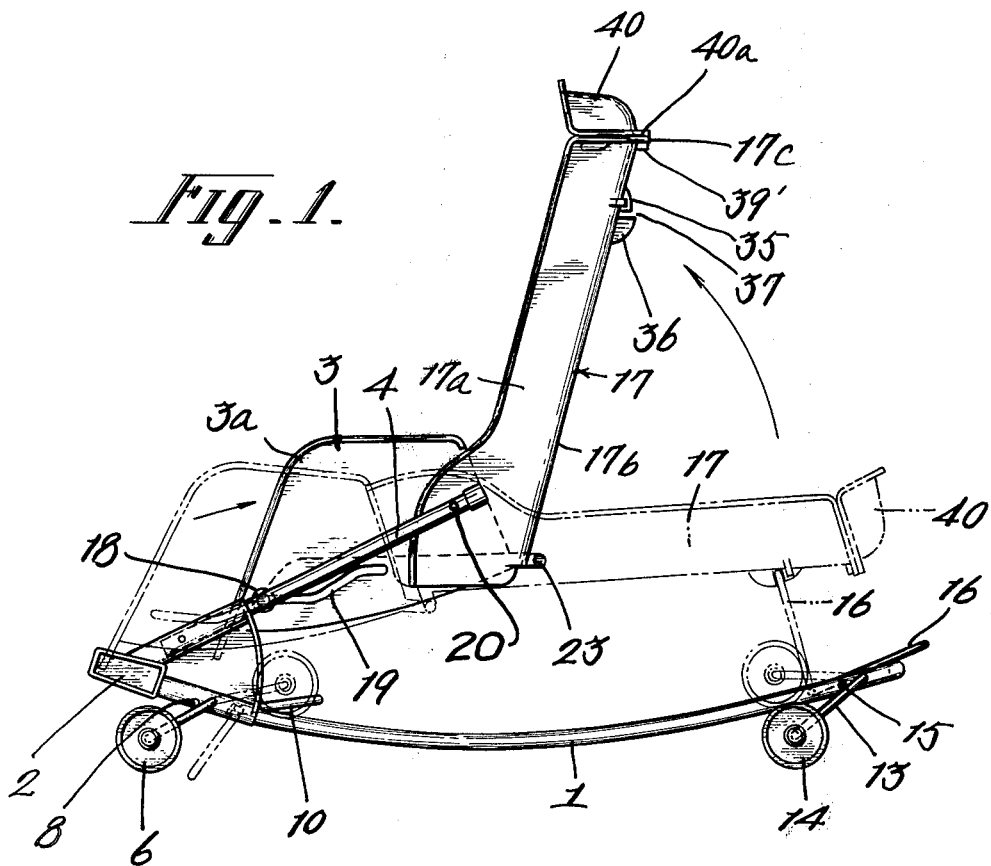
FIG. 1 is a side elvational view of one preferred embodiment of multi-purpose infant's wheeled chair constructed in accordance with the present invention.
Figure 1A:
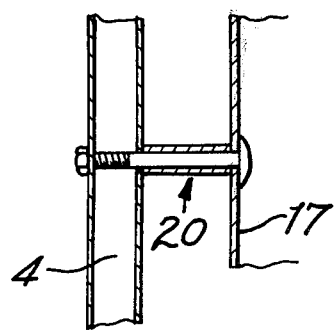
FIG. 1a shows an enlarged assembly detail.
Figure 4:
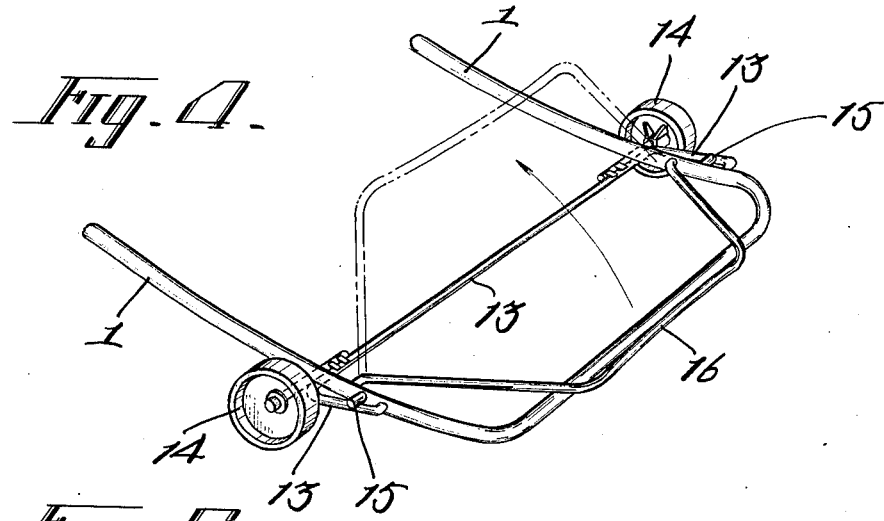
FIG. 4 is a fragmentary perspective view on an enlarged scale of said rear wheels, back rest upholding rod and their associated parts of said multi-purpose infant's wheeled chair.
Figure 8:
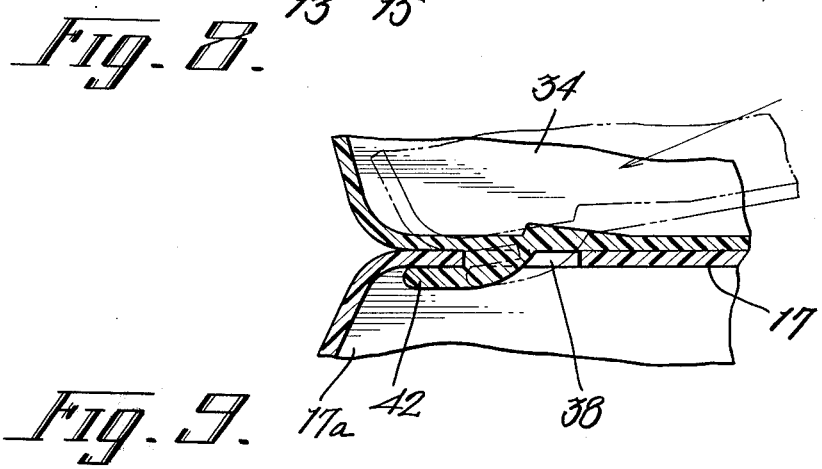
FIGS. 8 and 9 are cross-sectional views showing the connection details between the back rest and head cover and, FIG. 10 is a fragmentary vertical sectional view in side elevation showing the hinged connection between the chair body and back rest of said wheeled chair.
Figure 9:
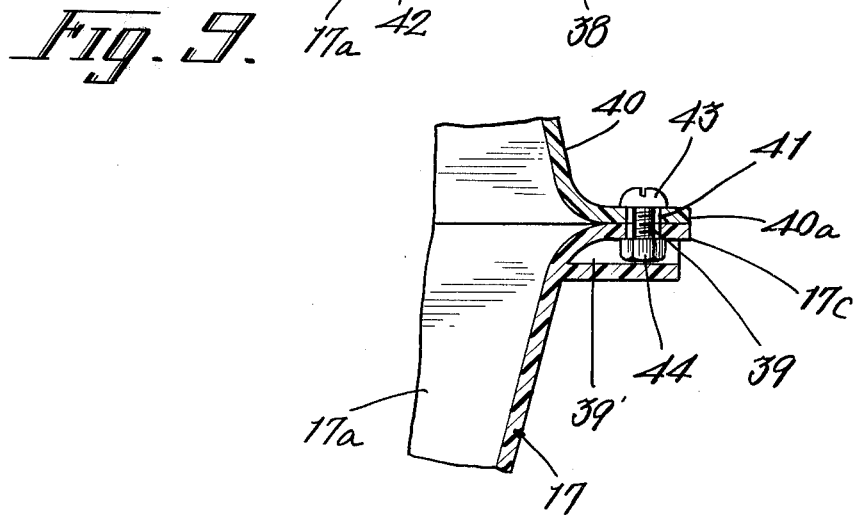
Figure 10:
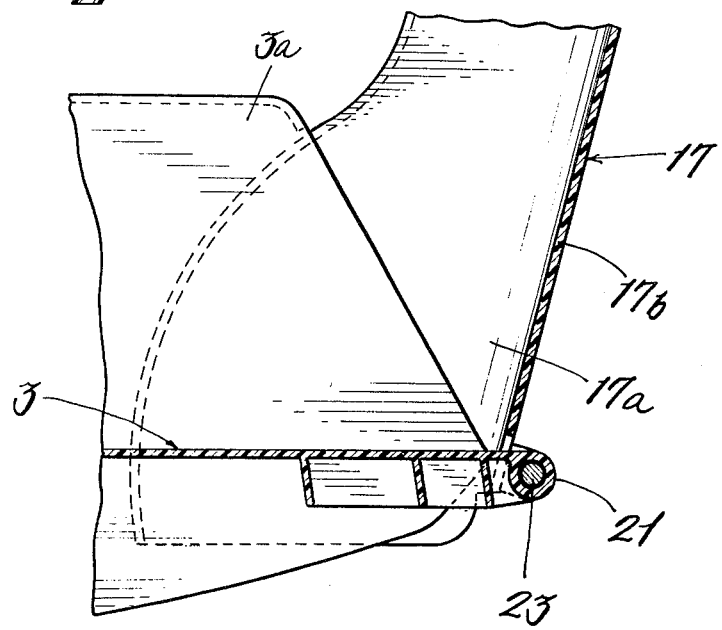

The present invention will be now described referring to the accompanying drawings which show one preferred embodiment of multi-purpose infant's wheeled chair of the invention for illustration purpose only. First, referring to FIG. 1 of the drawings, reference numeral 1 denotes a base member which has a substantially U-shape as seen in top plan and includes a pair of parallel and spaced longitudinal portions or legs connected at one end together by means of a transverse portion or arm. The base member 1 has been formed by bending a length of metallic pipe into a substantially U-shape and then curving the parallel longitudinal portions at their opposite and portions to give a downwardly directed arched configuration to the base member 1 as seen in side elevation. The front or connected ends of the longitudinal portions of the base member 1 are inserted in the lower holes 2a formed along the lower edges of a pair of sector members 2 which are provided in alignment with the respectively associated base member longitudinal portions and also formed with upper holes 2b along the upper edges of the sector members at an angle with respect to the lower holes 2a. That is, the lower and upper holes 2a and 2b diverge from each other toward the rear ends of the base member 1. The upper holes 2b in the pair of sector members 2 receive one end of each of the pair of chair body support rods 4 for a chair body 3. On each side of the base member 1, the associated base member longitudinal portion, sector member 2 and chair body support rod 4 lie in substantially the same vertical plane as seen in FIG. 1. The inserted ends of the base member longitudinal portions and the chair body support rods 4 are firmly held in position within the associated holes 2a and 2b in the associated sector members 2, respectively, by means of rivets.

Pivoted to the front ends of the opposite longitudinal portions or legs of the base member 1 which are inserted in the sector member lower holes 2a are front wheel support rods 5 which in turn rotatably support at the other ends their associated front wheels 6. Thus, the front wheels 6 are movable between the upper or stowage position in which the wheels are positioned above the ground or other support floor (as shown by the full lines in FIG. 2) and the lower or operation position in which the wheels contact the ground or support floor (as seen by the phantom lines in FIG. 2) for the purpose to be described hereinafter. As shown in FIG. 2, in order to prevent the front wheels 6 from falling down inadvertently from the upper or stowage position, the sector members 2 are provided with projections 7 which project laterally and outwardly of the lower edges of the associated sector members and against which the wheel support rods 5 abut and similarly, laterally spaced stoppers 8 and 9 are provided on the sector members 2 adjacent to the projections 7 along the lower edges thereof of projecting laterally and outwardly of the associated sector members so that the wheel support rods 5 and accordingly, the front wheels 6 supported thereby can be positively held in their operative position. The projections 7 and stoppers 9 extend laterally from the outer sides of the sector members 2 by such a short distance that the wheel support rods 5 can be manually and easily disengaged from the projections 7 and stoppers 9 when the wheels 6 are desired to be moved from the stowage position to the operation position and vice versa. On the other hand, the stoppers 8 extend laterally from the outer sides of the sector members 2 by a distance substantially longer than the projections 7 and stoppers 9 so that the stoppers 8 can positively hold the wheel support rods 5 and accordingly, the front wheels 6 supported thereby in the operative position.

Reference numeral 10 denotes a substantially U-shaped stay rod 10 and the free ends of the opposite legs of the rod are pivoted to the inner sides of the pair of sector members 2 adjacent to the lower edges of the sector members. The stay rod 10 is pivotal between the upper or stowage position in which the stay rod is out of contact with the ground or other support floor and the lower or operative position in which the stay rod contacts the ground or support floor. In order to hold the stay rod 10 in its stowage position, projections 11 are provided on and extend laterally and inwardly of the inner sides of the sector members 2 along the lower edges of the members toward each other and the opposite legs of the stay rod may abut against the projections to be held in its stowage position and similarly, in order to hold the stay rod 10 in its operative position, laterally spaced stoppers 12 and 12' are provided on and extend laterally and inwardly of the inner sides of the sector members 2 at points along the lower edges of the sector members toward each other. The projections 11 and stoppers 12' extend laterally and inwardly from the inner sides of the sector members 2 by such a short distance that the stay rod can be manually and easily disengaged from the projections 11 and stoppers 12' when the stay rod is desired to be pivoted from the operative position to the stowage position and vice versa. On the other hand, the stoppers 12 extend laterally and inwardly from the inner sides of the sector members 2 by a distance substantially longer than the projections 11 and stoppers 12' so that the stoppers 12 can positively hold the stay rod 10 in the operative position.

A substantially U-shaped wheel support rod 13 is provided in the rear end portion of the base member 1 and the opposite end portions of the rod are bent at right angles to the intermediate portion of the rod with the extreme ends thereof pivoted to the outer sides of the opposite longitudinal portions of the base maimber. Stub shafts which rotatably support rear wheels 14 at one end are connected to the intermediate portion of the wheel support rod 13 for pivotal movement therewith.

The rear wheels 14 are also pivoted between the upper or stowage position in which the wheels are positioned above the ground or other support floor (shown by the phantom lines in FIG. 3) and the lower or operative position in which the wheels contact the ground or support floor (shown by the full lines in FIG. 3). In order to positively hold the rear wheel support rod 13 and accordingly, the rear wheels 14 supported thereby in both the stowage and operative positions, stoppers 15 project laterally from the outer sides of the opposite longitudinal portions of the base member 1 against which the rear wheel support rods abut in the stowage and operative positions of the rear wheels 14.

A substantially U-shaped back rest upholding rod 16 is provided in the rear end portion of the base member 1 adjacent to the rear wheel support rod 13 and the opposite legs of the upholding rod are pivoted at one end to the inner sides of the longitudinal portions of the base member 1 adjacent to the pivots of the rear wheel support rod 13. The back rest upholding rod 16 is adapted to pivot between the upright position in which the rod upholds a back rest 17 of which detailed description will be made hereinafter and the horizontal position in which the rod 16 lies on the base member 1.

As more clearly shown in FIGS. 1, 5 and 6, the rear end or exposed portions of the pair of chair body support rods 4 extend upwardly and rearwardly and one of the chair body support rods 4 (the left-hand side rod 4 as seen in FIG. 6) is provided in the rear end portion with a threaded hole 4a for threadingly receiving one threaded end of a transverse fastening rod 18 the other end of which is secured to the other chair body support rod 4. The chair body 3 has a substantially U-shaped cross-section as seen in top plan and the opposite side walls 3a of the chair body 3 have aligned bent slots 19 for loosely receiving the intermediate portion of the transverse threaded fastening rod 18. A pair of stub shafts 20 extend laterally and outwardly of the side walls 17a of the back rest 17 and are secured to the chair body support rods 4 adjacent to the rear ends thereof. The size and shape of the chair body 3 and back rest 17 are so selected that when the two members are assembled together, the side walls 17a of the back rest 17 closely fits on the side walls 3a of the chair body 3. The back of the chair body 3 is provided adjacent to the lower edge and partially cover thereof with half portions of hinges 21 and similarly, the outer side of the back wall 17b of the back rest 17 is provided adjacent to the lower edge thereof with the other half portions 22 of the hinges. Pins 23 are inserted in the mating hinge portions 21 and 22 to assemble the chair body 3 and back rest 17 so that the back rest embraces the chair body 3 partially. When thus assembled, the chair body 3 and back rest 17 can pivot back and forth relative to each other about the hinge pins 23. The backward and forward relative pivotal movement between the chair body 3 and back rest 17 is limited by the rod and slot arrangement 18, 19. In order to releasably hold the chair body 3 and back rest 17 in any desired position, the threaded fastening rod 18 is operated by a fastening mechanism which will be in detail described hereinbelow.

As more clearly shown in FIGS. 5 and 6, a metallic clip 24 is applied about the intermediate portion of the threaded fastening rod 18 which extends between the side walls 3a of the chair body 3 and secured to the rod by means of a pin 25. A washer 26 is applied about the rod 18 in contact with the inner side of the left-hand side chair body side wall 3a (as seen in FIG. 6) and a second washer 27 is applied about the rod 18 in contact with the outer side of the left-hand side chair body side wall 3a. A short sleeve 29 is loosely applied about the rod 18 between the washer 27 and the left-hand side chair body 4. The extreme end of the threaded end portion of the fastening rod 18 has a knob 30 thereon with a sleeve-like female-threaded member 31 interposed therebetween and a third washer 32 is interposed between the left-hand side chair body support rod 4 and knob 30. Thus, when the knob 30 is gripped and turned in the tightening direction, the tightening rod 18 is pulled leftwards to tighten the chair body 3 against the left-hand side chair body support rod 4. On the other hand, when the knob 30 is turned in the opposite or loosening direction, the tightening rod 18 is moved rightwards to release the chair body 3 from the chair body support rod 4 so that the chair body 3 and back rest 17 can be pivoted back and forth relative to each other.

Referring now to FIG. 7, the rear wall 17b of the back rest 17 is provided with a plurality of through holes 33 arranged in vertical and horizontal rows and a horizontal reinforcing strip 34 is provided on the back of the rear wall 17b of the back rest 17 between the adjacent horizontal rows of through holes 33. A pair of laterally spaced engaging pieces 35 are provided on the reinforcing strip 34 and a pair of projections 36 are also provided on the back of the rear wall 17b just below the pair of engaging pieces 35, respectively, with a clearance from the corresponding engaging pieces to receive the intermediate portion of the back rest upholding rod 17. The back rest 17 is formed with a flange 17c which extends along a substantial portion of the peripheral edge thereof except for the bottom thereof. The top portion of the peripheral flange 17c is provided with a pair of diametrically opposite slots 38 and a pair of spaces through holes 39 positioned between the slots 38. Nut receptacles 39' are provided on the back of the rear wall 17c of the back rest 17 just below the holes 39. A head cover 40 is attached to the top flange portion 17c of the back rest 17 in the manner as will be described just below.

That is, the head cover 40 is provided with a peripheral edge flange 40a and the lower portion of the peripheral edge flange is provided with through holes 41 which are adapted to align with the corresponding through holes 39 in the peripheral edge 17c when the head cover 39 is positioned on the back rest 17. The underside of the lower portion of the peripheral edge flange 40a is provided with tongue pieces 42 which are adapted to be received in the corresponding slots 38 in the peripheral edge flange 17c of the back rest 17. When the head cover 40 is assembled to the back rest 17, the head cover 40 is properly positioned on the rest back 17 with the holes 41 aligned with the holes 39 and the tongue pieces 42 received in the slots 38 and, thereafter, set screws 43 are passed through the aligned holes 39 and 41 into the nut receptacles 39' followed by threading nuts 44 on the set screws 43 to thereby secure the head cover 40 to the back rest 17. The head cover 40 is also provided with a plurality of ventilation holes 45.

With the above construction and arrangement of the parts of the multi-purpose infant's wheeled chair of the invention, the chair can be employed in the following several ways:

A. The front and rear wheels 6 and 14 are maintained in their lower or operative position below the base member 1 under stabilized condition in which these wheels contact the ground or other support floor so that the chair can be moved along the ground as baby carriage. In such a position, the stay rod 10 is maintained in its stowage position and the back rest 16 lies on the base member 1 with the back rest held substantially upright.

B. When the front and rear wheels 6 and 14 are maintained in the stowage or upper position above the base member 1, the chair can be rocked endwise with the base member 1 lying directly on the ground or support floor. That is, the chair serves as a rocking play device like a rocking horse.

C. When the back rest 17 is lowered to the substantially horizontal position as shown by the phantom lines in FIG. 1 and supported by the back rest upholding rod 16, the chair body 3 is pivoted forwardly with respect to the back rest 17 to the position shown by the phantom lines in FIG. 1 so that the chair can be employed as a bed. In such a position, the stay rod 10 is lowered to the operative position.

From the foregoing description of the present invention, it will be understood that the chair can be positioned in the various positions referred to above with an infant being held on the chair body and the head of the infant can be effectively protected against any possible hazard by the head cover and especially, the upper portion of the back rest of the infant's chair is stabilized.

In the foregoing description has been made of only one embodiment of the invention, but it will readily occur to those skilled in the art that the same is illustrative in nature, but does not limit the scope of the invention in any way. The scope of the invention is only limited by the appended claims.

What is claimed is:

1. A multi-purpose infant's wheeled chair comprising a downwardly arched base member having the front and rear ends directed upwardly, front wheel support rods having one end pivoted to said front end of the base member and rotatably supporting front wheels at the other ends, rear wheel support rods having one end pivoted to said rear end of the base member and rotatably supporting rear wheels at the other ends, sector members provided at said front end of the base member receiving the front end of said base member, chair body support rods having the front ends received in said sector members and the rear ends extending from said sector members toward said rear end of the base member, a chair body slidably supported on the opposite sides by said chair body support rods, a back rest hinged to said chair body for pivotal movement between upright and horizontal positions, a head cover detachably connected to said back rest, a back rest upholding rod pivoted to said rear end of the base member for movement between the upright back rest supporting position and the horizontal position and engaging means provided on said base member and sector members for engaging said front and rear wheel support rods to selectively maintain the front and rear wheels supported by the wheel support rods in the operative and stowage positions pivoted positions thereof under stabilized conditions.

2. The multi-purpose infant's wheeled chair as set forth in claim 1, in which said back rest upholding rod is received under stabilized condicions in a clearance defined between opposite projections provided on the back of the rear wall of said back rest.

3. The multi-purpose infant's wheeled chair as set forth in claim 2, in which said side walls of the chair body are provided with aligned slots through which said threaded fastening rod extends and said slots and fastening rod provide means for limiting the back and forth movement of the chair body.

4. A multi-purpose infant's wheeled chair comprising a substantially U-shaped base member including a pair of opposite and parallel downwardly arched longitudinal legs connected together at the rear ends by a transverse arm, a pair of sector members having lower holes along the lower edges for receiving the front ends of said legs of the base member, said sector members further including upper holes along the upper edges extending at an angle with respect to said lower holes, a pair of front wheel support rods pivoted at one end to said front ends of the base member legs and rotatably supporting front wheels at the other ends, a pair of chair body support rods having the front ends received in said upper holes in the sector members and the rear ends extending rearwardly and upwardly from the sector members, a movable chair body supported by said pair of chair body support rods for movement back and forth and including a pair of opposite side walls and a rear wall, a back rest secured to the rear ends of said pair of chair support rods and hinged to said chair body for pivotal movement between substantially upright and substantially horizontal positions, a substantially U-shaped back rest upholding rod having opposite legs pivoted to said legs of the base member for movement between a substantially upright position in which the back rest support rod supports said back rest in the horizontal position and a substantially horizontal position in which the back rest rod lies on the base member, a head cover detachably secured to said back rest and a pair of rear wheel support rods pivoted at one end to said rear ends of the base member legs and rotatably supporting rear wheels at the other ends.

5. The multi-purpose infant's wheeled chair as set forth in claim 4, further including a substantially U-shaped stay rod having the free ends of its opposite legs pivoted to said front ends of the base member legs for movement between stowage and operative positions in the latter of which said stay rod holds the chair in its stabilized position.

6. The multi-purpose infant's wheeled chair as set forth in claim 4, further including a threaded fastening rod extending transversely between said pair of chair body support rods through said side walls of the chair body with one end protruding out of one of the chair body support rods and receiving a knob mounted thereon so as to releasably fasten the chair body to said one chair body support rod.

7. The multi-purpose infant's wheeled chair as set forth in claim 4, in which said side walls of the chair body are provided with aligned slots through which said threaded fastening rod extends and said slots and fastening rod provide means for limiting the back and forth movement of the chair body.

8. The multi-purpose infant's wheeled chair as set forth in claim 4, in which the back of said rear wall of the back rest is provide with spaced projections for engaging the arm of said U-shaped back rest upholding rod when the back rest is in the horizontal position and the back rest upholding rod is in the upright position.

9. The multi-purpose infant's wheeled chair as set forth in claim 4, in which said opposite legs of the base member and said sector member are provided with wheel retaining means for abutting against said front and rear wheel support rods so as to releasably and selectively hold the front and rear wheels in the operative and stowage positions.

* * * * *